United States Patent [19]

Locati

[11] Patent Number: 5,402,706

[45] Date of Patent: Apr. 4, 1995

[54] AUTOMATIC MACHINE FOR COFFEE BEVERAGE, IN WHICH THE GROUND COFFEE IS COMPRESSED IN AN INFUSION CHAMBER

[75] Inventor: Santino Locati, Milan, Italy

[73] Assignee: Cimbali S.p.A., Milan, Italy

[21] Appl. No.: 187,696

[22] Filed: Jan. 26, 1994

[30] Foreign Application Priority Data

Jan. 27, 1993 [IT] Italy ................. MI93A0129

[51] Int. Cl.⁶ ............................................. A47J 31/00
[52] U.S. Cl. .................... 99/287; 99/289 R; 99/300
[58] Field of Search ............... 99/286, 287, 289 R, 99/289 P, 279, 295, 297, 300, 302 R; 426/433

[56] References Cited

U.S. PATENT DOCUMENTS

| | | | |
|---|---|---|---|
| 3,266,410 | 8/1966 | Novi | 99/287 |
| 4,457,216 | 7/1984 | Dremmel | 99/289 R |
| 5,230,277 | 7/1993 | Bianco | 99/287 |
| 5,255,594 | 10/1993 | Grossi | 99/287 |

*Primary Examiner*—Robert W. Jenkins
*Attorney, Agent, or Firm*—Collard & Roe

[57] ABSTRACT

Automatic coffee machine has ground coffee deposited into an infusion chamber, in which it is compressed between an infuser piston and a filter piston. A packing stabilizes the seal between the infusion chamber and the infuser piston. The infuser piston is divided into two parts, with one part sliding into the other part against an opposing spring resistance.

3 Claims, 2 Drawing Sheets

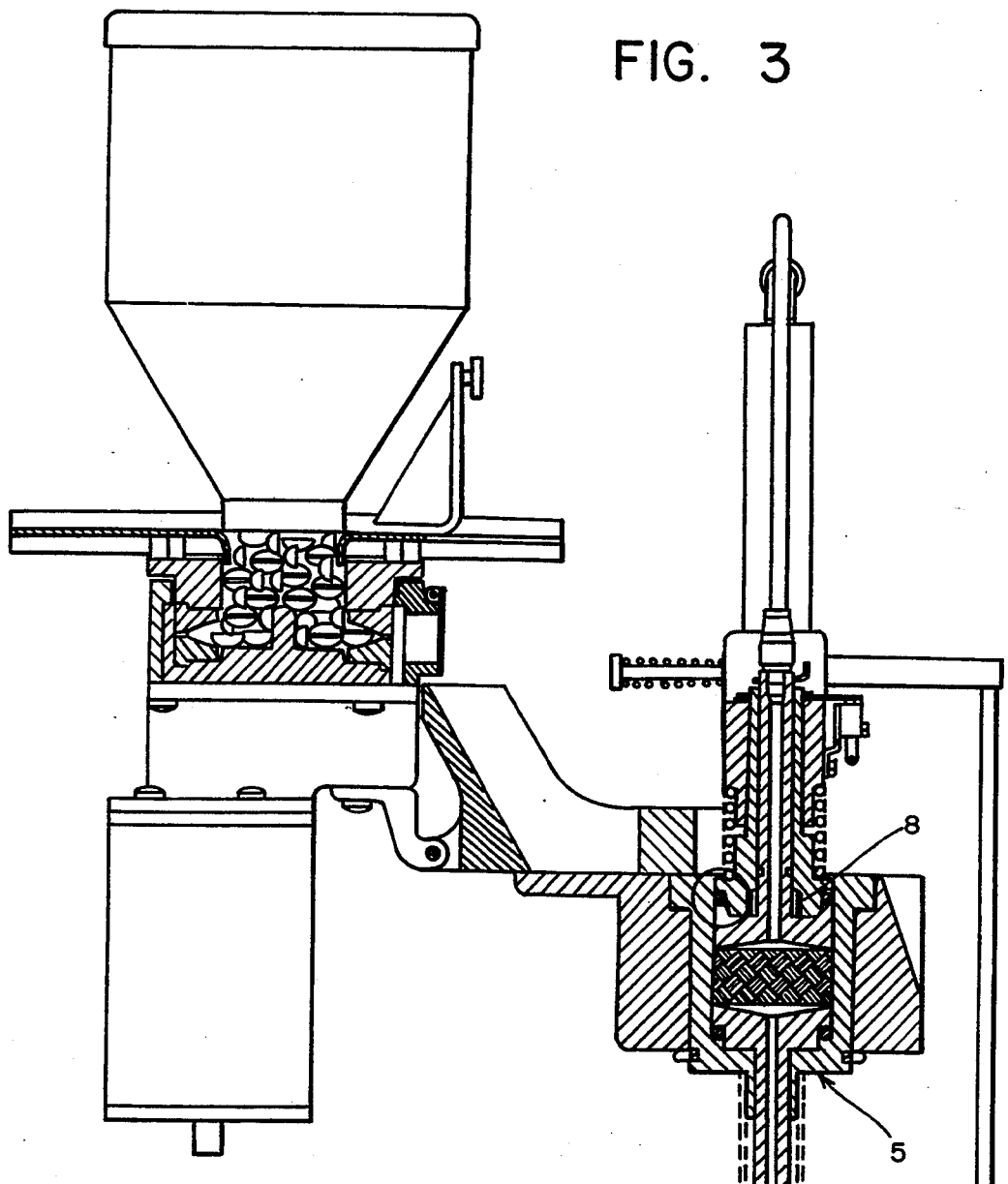
FIG. 3
FIG. 4
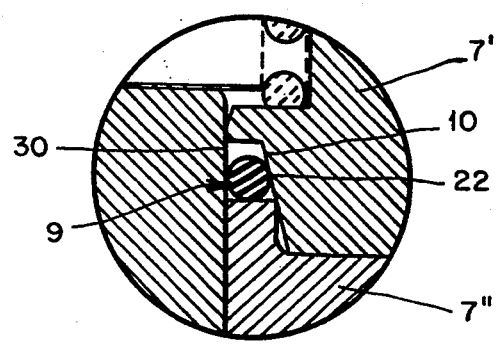

AUTOMATIC MACHINE FOR COFFEE BEVERAGE, IN WHICH THE GROUND COFFEE IS COMPRESSED IN AN INFUSION CHAMBER

BACKGROUND OF THE INVENTION

1. Field of the Invention

The present invention relates to an automatic coffee machine, in which the ground coffee is delivered to an infusion chamber, in which it is compressed between an infuser piston and a filter piston and from which exits a coffee beverage, deliverable as coffee alone or, combined with milk, in the form of cappuccino. A toroid-shaped rubber ring is positioned to stabilize the seal between the infusion chamber and the infuser piston while the infuser piston is working in the infusion chamber to perform a compression of the ground coffee.

2. The Prior Art

In known machines of this kind, the infuser piston has, in a fixed position, a toroid rubber ring (a so-called O-Ring) for the seal. This ring is subject to considerable wear, due to the entry stress of the infuser piston into the infusion chamber and the scraping action generated along the entire path of the infuser piston movement.

SUMMARY OF THE INVENTION

It is an object of the present invention to substantially reduce the wear and tear on this packing material.

This and additional objects and advantages of the present invention are achieved primarily by the fact that:
- the infuser piston is divided into two parts, with one part sliding into the other part against an opposing spring resistance;
- the first part of the infuser piston, which first penetrates into the infusion chamber, forms for the packing a first seat which is level and orthogonal with respect to the direction of penetration of the infuser piston; and
- the second part of the infuser piston, which penetrates into the infusion chamber after the first one, forms for the packing a second seat which is conical, the diameter of which increases with the reduction of the spacing between the two parts of the infuser piston in the infusion chamber.

The packing, the opposing spring and the two seats for the packing are appropriately dimensioned, according to the invention, in such a manner that during the compression exercised by the infusion piston on the coffee, the packing does not touch the internal wall of the infusion chamber as long as the compressive force exerted to compress the ground coffee is lesser than the resistance force of the opposing spring.

In a preferred embodiment of the invention, the packing experiences a shift onto its conical seat during the penetration of the infuser piston into the infusion chamber, which shift does not bring about the gradual approach to the internal wall of the infusion chamber until the desired seal is stabilized.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements throughout the several views:

FIG. 3 shows the toroid rubber ring in the infusion chamber in the final phase of the compression exercised by the infuser piston; and FIG. 4 is the enlargement of FIG. 2.

DETAILED DESCRIPTION OF PREFERRED EMBODIMENTS

Figure 1:
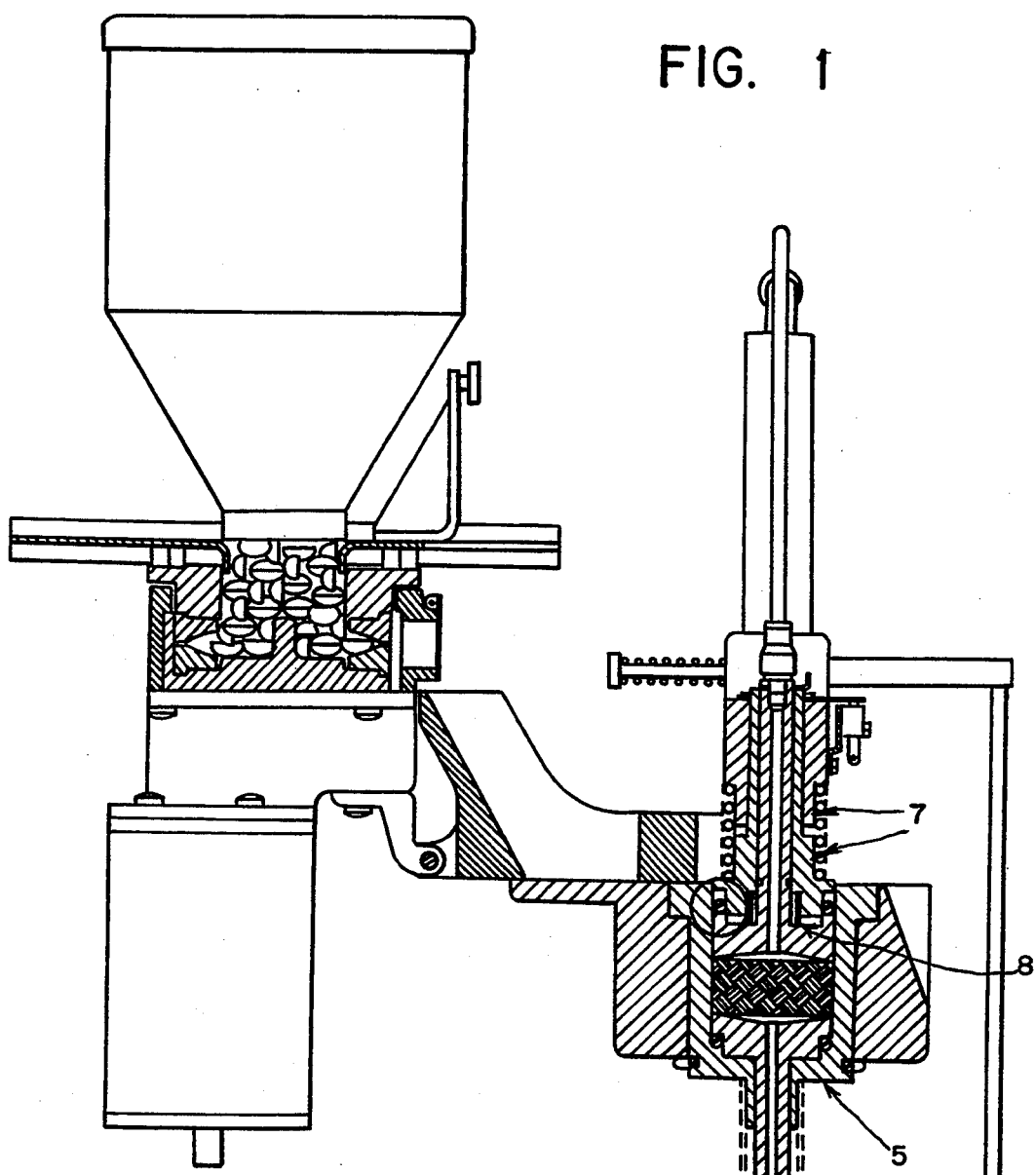
FIG. 1 shows a toroid rubber ring in the infusion chamber during the compression exercised by the infuser piston.

Turning now in detail to the drawings, in the stage shown in FIG. 1, the infuser piston 7, formed by the two parts 7' and 7Δ (enlargement of FIG. 4), descends into the infusion chamber 5.

Figure 2:
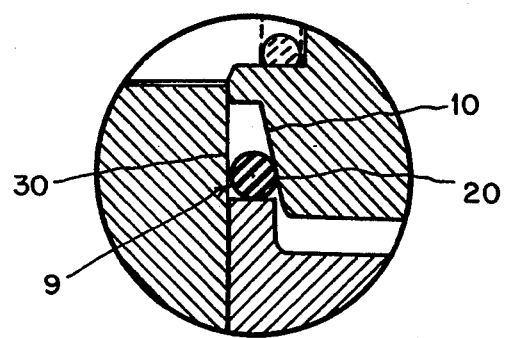
FIG. 2 is the enlargement of FIG. 1.

As long as the force to compress the ground coffee is lesser than the resistance force of the opposing spring 8, the packing 9 remains in the position indicated in the enlargement of FIG. 2. The packing is preferably a toroid rubber ring. The rubber can be of a known material such as styrene-butadiene copolymer.

As can be seen in FIG. 2, the packing 9 does not brush against or scrape against the internal wall 30 of the infusion chamber 5, because it remains positioned on the minimum diameter 20 of the conical seat 10, without touching the chamber.

In the operating stage shown in FIG. 3, in which the force to compress the ground coffee is greater than the resistance force of spring 8, the existing space between parts 7' and 7" of the infusion piston 7 is eliminated, as shown in the enlargement of FIG. 4.

This brings about the shifting of the packing 9 upward to the maximum diameter 22 of the conical seat 10, carrying through the optimal compression on the internal wall 30 of the infusion chamber 5 and hence attaining the desired seal.

The advantages of the present invention are to permit eliminating almost completely the brushing and scraping of the packing 9, thereby keeping wear and tear to a minimum.

While several embodiments of the present invention have been shown and described, it is to be understood that many changes and modifications may be made thereunto without departing from the spirit and scope of the invention as defined in the appended claims.

What is claimed is:

1. Automatic coffee machine, comprising
an infusion chamber for ground coffee;
an infuser piston in the infusion chamber and a filter piston for compressing coffee, the coffee beverage exiting from said infusion chamber, deliverable as coffee;
a toroidal rubber ring for stabilizing the seal between said infusion chamber and the infusion piston while said infusion piston is working in said infusion chamber compressing the ground coffee;
said infuser piston having first and second parts, a spring located in a spacing between said first and second parts with one part sliding into the other part against said spring,
the first part of said infuser piston being the first part to penetrate said infusion chamber and forming for said rubber ring a first seat, level, orthogonal with respect to the direction of penetration of said infuser piston; and the second part of said infuser piston penetrating the infusion chamber after said first part and forming for said rubber ring a second seat of conical shape, the diameter of which increases with the reduction of the spacing between said first and second parts of said infuser piston in said infusion chamber.

2. Automatic coffee machine according to claim 1, wherein said rubber ring, the opposing spring and the two seats for said rubber ring being dimensioned in such a manner that, during the compression exercised by said infuser piston on the coffee, said rubber ring does not touch the internal wall of the infusion chamber as long as the force exerted to compress the ground coffee is lower than the resistance force of the opposing spring.

3. Automatic coffee machine according to claim 1, wherein during the penetration of the infuser piston into the infusion chamber, the rubber ring experiences a shift which does not bring about the gradual approach to the internal wall of the infusion chamber until the desired seal is stabilized.

* * * * *